(12) United States Patent
Seifert

(10) Patent No.: US 8,944,371 B2
(45) Date of Patent: Feb. 3, 2015

(54) TRANSMISSION OF A CONTROL FORCE

(75) Inventor: Jost Seifert, Manching (DE)

(73) Assignee: EADS Deutschland GmbH, Ottobrunn (DE)

(*) Notice: Subject to any disclaimer, the term of this patent is extended or adjusted under 35 U.S.C. 154(b) by 293 days.

(21) Appl. No.: 13/310,141

(22) Filed: Dec. 2, 2011

(65) Prior Publication Data

US 2012/0138740 A1 Jun. 7, 2012

(30) Foreign Application Priority Data

Dec. 3, 2010 (DE) .......................... 10 2010 053 396

(51) Int. Cl.
*B64C 13/24* (2006.01)
*B64C 13/42* (2006.01)
*B64C 13/50* (2006.01)

(52) U.S. Cl.
CPC ............... *B64C 13/42* (2013.01); *B64C 13/503* (2013.01)
USPC .......................................... 244/99.4; 91/509

(58) Field of Classification Search
USPC ............... 244/99.3, 99.4, 99.9; 91/509, 510; 74/89.27, 479.01
See application file for complete search history.

(56) References Cited

U.S. PATENT DOCUMENTS

| | | | | |
|---|---|---|---|---|
| 2,675,679 A * | 4/1954 | Parker | | 91/509 |
| 3,358,565 A * | 12/1967 | Townsend | | 91/509 |
| 3,411,410 A * | 11/1968 | Westbury et al. | | 91/1 |
| 3,433,125 A * | 3/1969 | Gemmell | | 91/363 R |
| 3,434,387 A * | 3/1969 | Ellis | | 91/1 |
| 3,593,620 A * | 7/1971 | Foerster et al. | | 91/510 |
| 4,296,677 A | 10/1981 | Little et al. | | |
| 4,531,448 A * | 7/1985 | Barnes | | 91/384 |
| 4,532,853 A * | 8/1985 | Stangroom | | 91/165 |
| 4,659,036 A * | 4/1987 | Pinson | | 244/3.22 |
| 4,699,043 A * | 10/1987 | Violante De Dionigi | | 91/182 |
| 4,884,401 A * | 12/1989 | Metcalf et al. | | 60/403 |
| 4,904,999 A * | 2/1990 | Klansnic et al. | | 340/945 |
| 4,919,064 A * | 4/1990 | Ehluss et al. | | 114/150 |
| 5,701,801 A * | 12/1997 | Boehringer et al. | | 92/166 |
| 6,209,825 B1 * | 4/2001 | Scott | | 244/226 |
| 6,241,182 B1 * | 6/2001 | Durandeau et al. | | 244/99.4 |
| 6,776,376 B2 * | 8/2004 | Collins | | 244/213 |
| 7,837,144 B2 * | 11/2010 | Kothera et al. | | 244/99.2 |
| 8,070,091 B2 * | 12/2011 | Benson et al. | | 244/17.25 |
| 8,104,710 B2 * | 1/2012 | Harvey et al. | | 244/99.2 |
| 8,172,174 B2 * | 5/2012 | Hejda | | 244/99.2 |
| 8,322,242 B2 * | 12/2012 | Gronli | | 74/89.27 |
| 8,418,954 B2 * | 4/2013 | Allen | | 244/99.3 |
| 2008/0203223 A1 * | 8/2008 | Cyrot et al. | | 244/99.3 |

* cited by examiner

*Primary Examiner* — Tien Dinh
*Assistant Examiner* — Michael Kreiner
(74) *Attorney, Agent, or Firm* — Crowell & Moring LLP

(57) ABSTRACT

A control force transmission arrangement for an aircraft is provided. A transmission device has a first and a second force transmission point, and a coupling unit disposed between them. The coupling unit has a first and a second side element and a connecting element. The first and the second side elements are each connected to the first force transmission point and to the connecting element. At least the first side element has an element for altering the length of the side element. The second force transmission point is provided on the connecting element and is adjustable at least between a first and a second position.

10 Claims, 16 Drawing Sheets

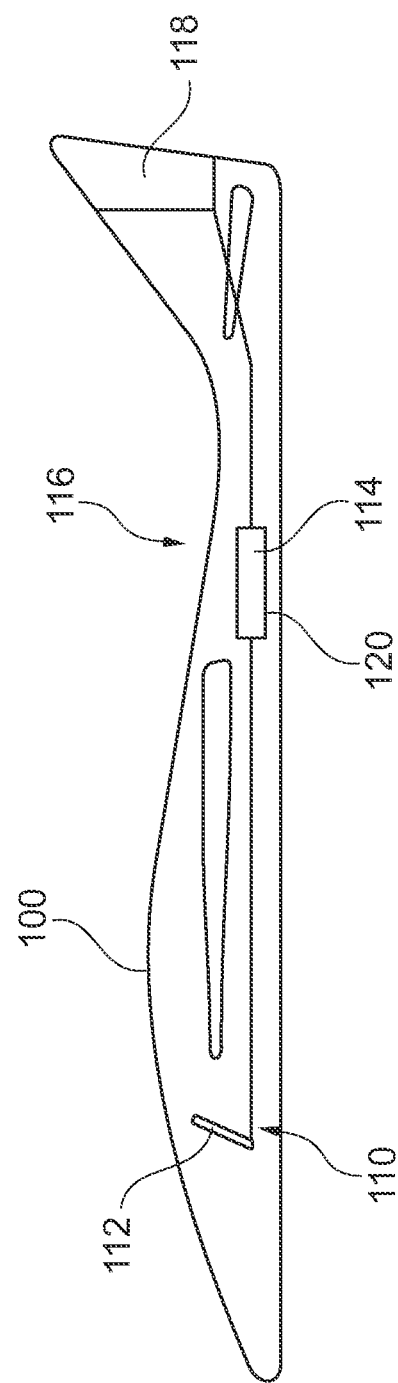

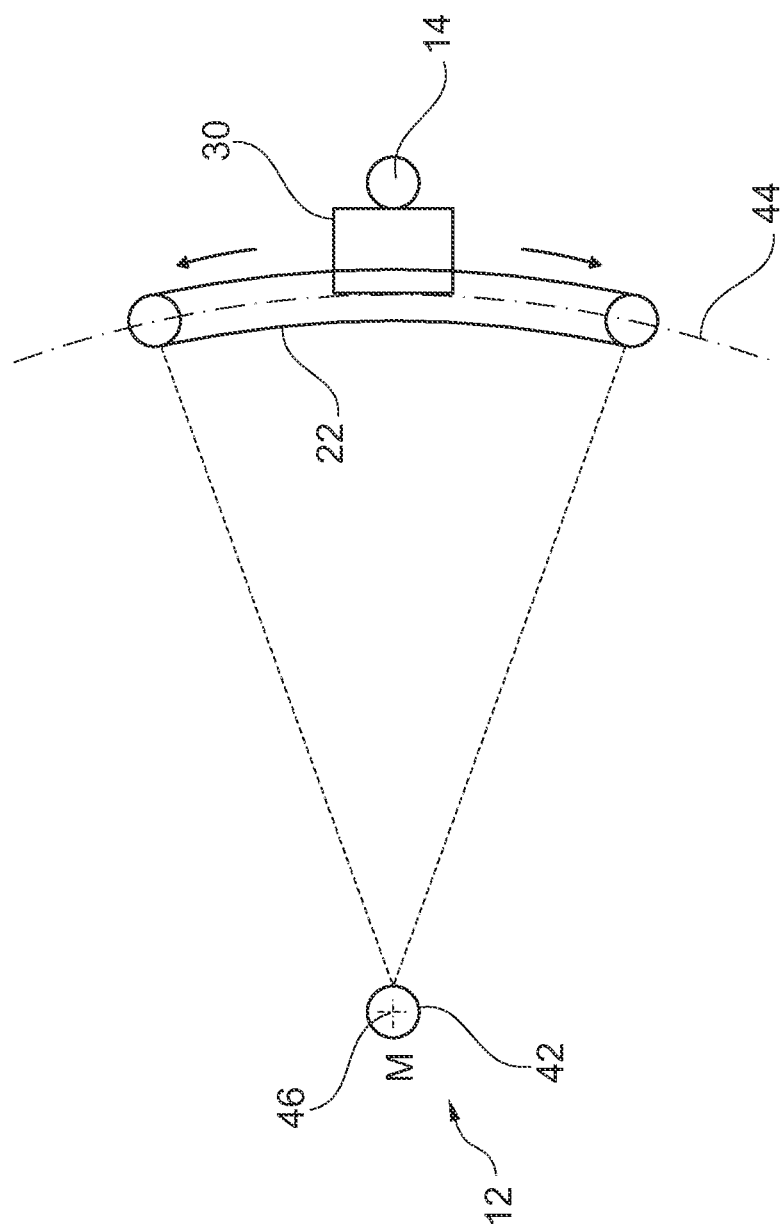

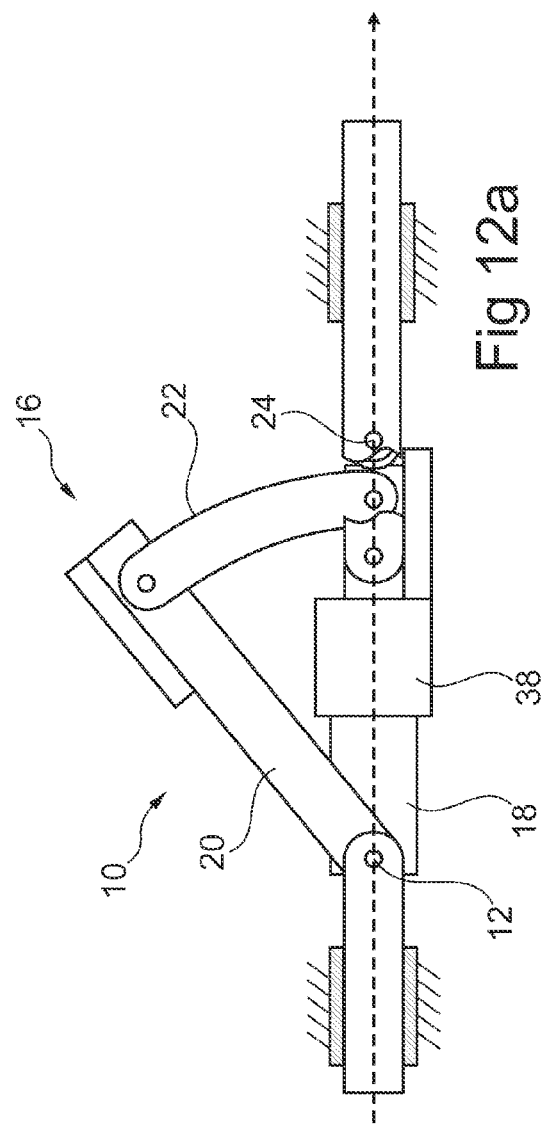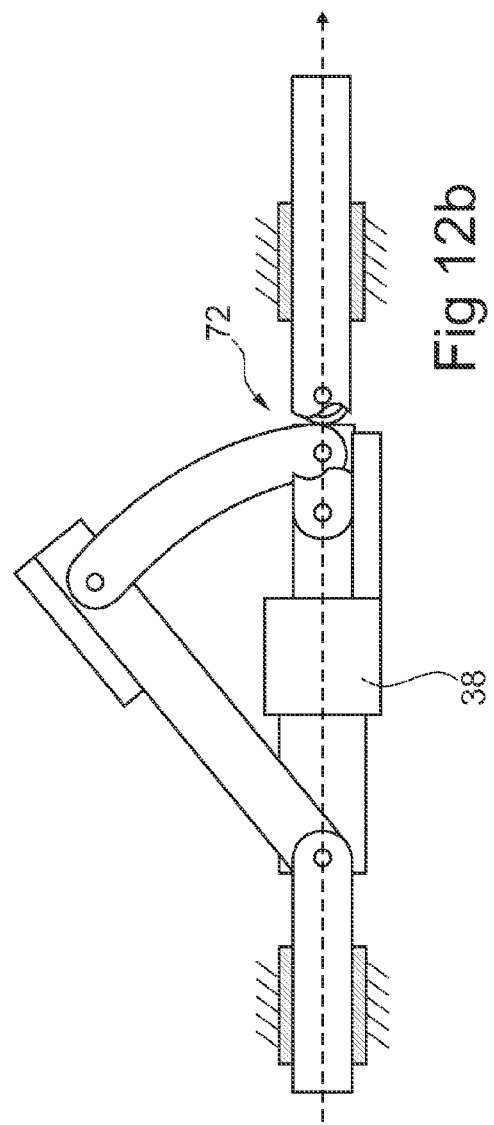

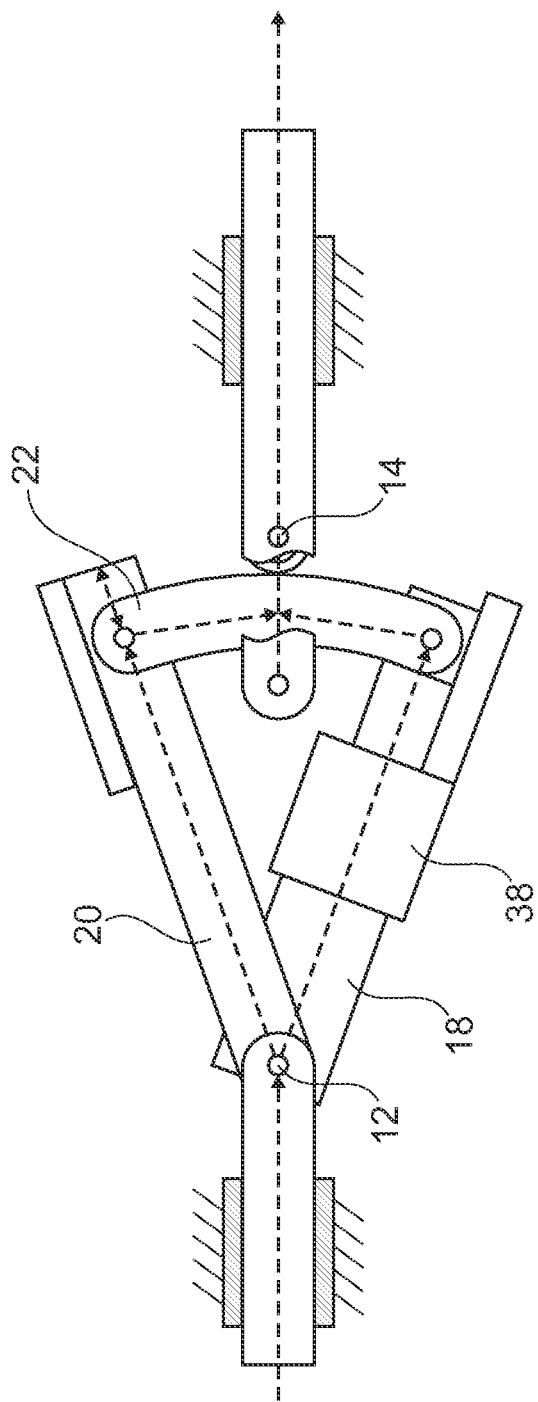

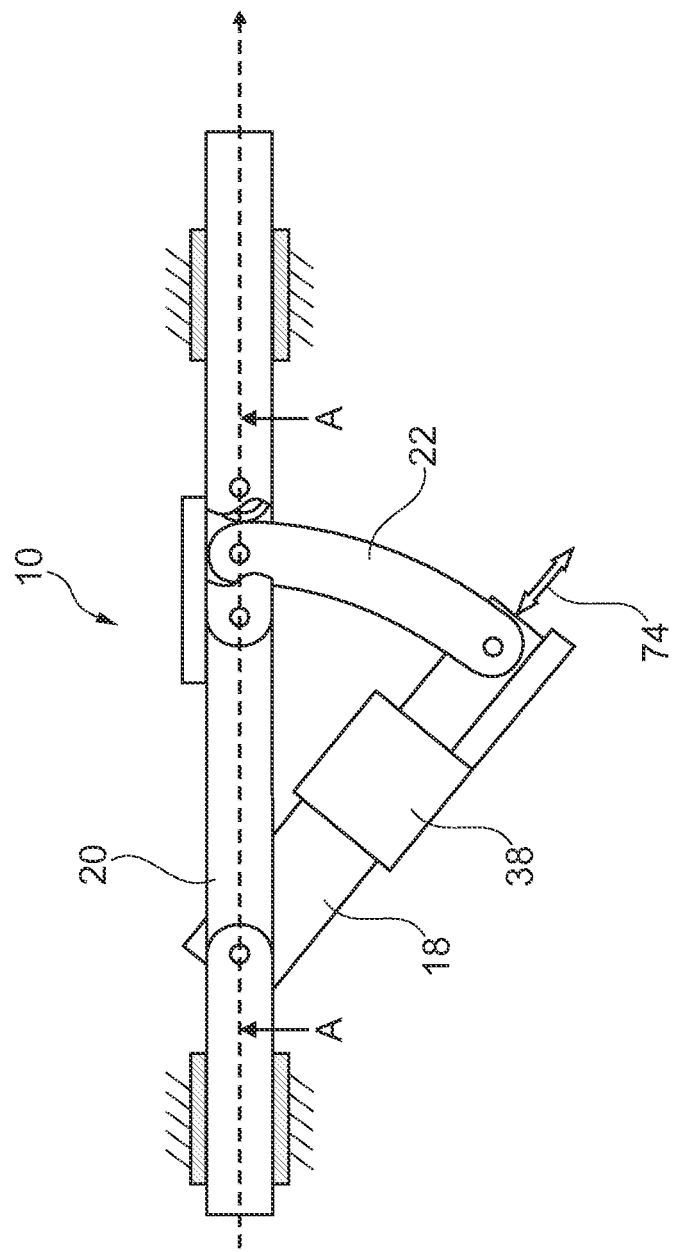

TRANSMISSION OF A CONTROL FORCE

CROSS REFERENCE TO RELATED APPLICATIONS

The present application claims priority under 35 U.S.C. §119 to German Patent Application No. DE 10 2010 053 396.3, filed Dec. 3, 2010, the entire disclosure of which is herein expressly incorporated by reference.

BACKGROUND AND SUMMARY OF THE INVENTION

The present invention relates to a transmission device for transmission of a control force in a vehicle, an aircraft with a control system for actuating a control component, the use of a transmission device in an aircraft and a method for switching from a first transmission mode to a second transmission mode for actuation of a control component in a vehicle.

Control forces are used at various locations in vehicles in order to be able to drive or control different vehicle components. For this purpose transmission devices are used to generate the control force at a location spaced from or remote from the control component to be controlled within the vehicle. For example in aircraft, e.g. airplanes, control forces are provided for controlling aeronautical components and are transmitted by transmission devices to the element to be controlled. Particularly in the case of aircraft, depending upon the element to be controlled, a redundancy of the control system is desirable, and in many cases required. U.S. Pat. No. 4,296,677 discloses a hydraulic cylinder, designed as a tandem cylinder, in order to have the necessary redundancy.

However, it has been shown that there is a need to provide a transmission device for transmission of a control force in a vehicle, which device is simpler to produce, cost-effective and also ensures redundancy.

This is achieved by a transmission device for transmission of a control force in a vehicle, by an aircraft with a control system for actuating a control component, by the use of a transmission device in an aircraft and by a method for switching from a first transmission mode to a second transmission mode for actuation of a control component in a vehicle according to one of the independent claims.

According to an exemplary embodiment of the invention a transmission device for transmission of a control force in a vehicle is provided, comprising a first force transmission point, a second force transmission point and a coupling unit disposed between the first and the second force transmission points. The coupling unit has a first side element, a second side element and a connecting element. The first and the second side elements are each rotatably connected at one end to the first force transmission point and are connected at the respective other end to the connecting element at a respective first or second connection point. The first and the second connection points on the connecting element are spaced apart from one another. At least the first side element has an element for altering the length of the side element. The second force transmission point is provided on the connecting element and is adjustable at least between a first and a second position, wherein the second force transmission point in the first position is disposed in the region of the first connection point and in the second position is disposed in the region of the second connection point.

According to a further aspect of the invention the vehicle is an aircraft, in particular an airplane.

According to a further aspect of the invention the transmission of force from the coupling unit to the second force transmission point takes place via the connecting element.

According to a further aspect of the invention the coupling unit is movable in such a way that the position of the second force transmission point is adjustable, preferably variable.

According to a further aspect of the invention the adjustability covers an area at least from the first to the second connection point.

According to a further aspect of the invention the transmission of force from the coupling unit to the first force transmission point takes place via the connection to the first and the second side elements.

According to a further aspect of the invention a guide element is provided on the connecting element, and the connecting element is movably retained in relation to the guide element between the first position and the second position, wherein the second force transmission point is formed on the guide element.

According to a further aspect of the invention a control rod is articulated on each of the force transmission points for transmitting the control force.

According to a further aspect of the invention the control rods are each retained in a linear guide so as to be movable in the rod direction.

According to an exemplary embodiment of the invention the element for altering the length is an actuator. The actuator is, for example, an electromechanical actuator.

According to a further aspect of the invention the actuator is a fluid-mechanical actuator, for example a hydraulic operating cylinder or a compressed air cylinder.

According to a further feature of the invention the element for altering the length is a spring element.

According to an exemplary embodiment of the invention one end in each case of the first and of the second side elements is retained at a common retaining point on the first force transmission point.

According to a further aspect of the invention the first and the second side elements with the connecting element form a triangle on the basis of the attachment points.

According to a further aspect of the invention the side elements are linear or some other shape, for example curved.

According to an exemplary embodiment of the invention the connecting element forms an arc of a circle, wherein the center point of the arc lies in the region of the common retaining point.

According to an exemplary embodiment of the invention the second side element is of rigid construction. The coupling unit is movable between a first setting and a second setting, wherein in the first setting a transmission of force takes place in a region which is disposed in alignment with the connection of the first side element to the first force transmission point and the first connection point. In the second setting a transmission of force takes place in a region which is disposed in alignment with the connection of the second side element to the first force transmission point and the second connection point.

In this way it is possible to provide a combination of a conventional control and a fly-by-wire flight control, wherein, because of the movable coupling unit, the transmission device according to the invention makes available a kinematic design by which the redundancy necessary for safety is made possible.

According to an exemplary embodiment of the invention, in the first position the control force in the transmission device is generated by the actuator, wherein in the second position the control force is generated by an actuating device which is provided outside the transmission device. The actuating device is for example a joystick.

According to an exemplary embodiment of the invention the second side element also has an actuator for altering the length of the side element, wherein at least a third position is provided in which the transmission of force takes place in a region which lies in the middle between the first and the second connection points.

In this way a multiply redundant control system is made available, wherein it is ensured that failure of an actuator does not lead to a complete failure of the system, because a kinematic design is provided by the movable coupling unit, wherein the other one of the two actuators takes over the transmission of force. In other words, in spite of the failure of one actuator the same control characteristic is maintained as in the original state. In particular the same maximum deflection and also the rate of adjustment are maintained.

According to a further aspect of the invention the two actuators are each provided as an electromechanical actuator. For example, the two actuators are designed as electric spindle motors, wherein the spindle drives are designed for example to be self-locking.

According to a further aspect of the invention the actuators each have an actuating mechanism without redundancy. For example, the actuators each have a single fluid-mechanical circuit if the actuators are designed as fluid-mechanical operating members. For example, the two actuators are each designed as a simple fluid-mechanical operating cylinder, for example as a hydraulic operating cylinder.

According to a further aspect of the invention the two actuators each form a sub-system, wherein in the event of failure of a sub-system due to the possible alternation between the two sub-systems the same control characteristic is maintained as in the original state.

According to an exemplary embodiment of the invention the third position forms a normal setting in which both actuators are actuated in order to generate the control force, wherein the first and the second settings each form a redundancy setting in which in each case only one of the two actuators generates the control force.

According to a further aspect of the invention a device for monitoring the two actuators is provided.

According to a further aspect of the invention at least one operating element is provided for moving the coupling unit.

According to a further aspect of the invention the monitoring device activates the at least one operating element in the event of failure or malfunction of an actuator.

The invention also comprises an aircraft. According to an exemplary embodiment of the invention an aircraft with a control system is provided for actuating a control component, wherein the control system has an input device for input of the control command, a control force generating device, a transmission system for transmission of the control force and at least one aeronautical control component. The transmission system has at least one transmission device according to one of the preceding embodiments and aspects of the invention.

According to a further aspect of the invention the control component is provided for the primary flight control.

According to a further aspect of the invention the control component is provided for the secondary flight control.

For example, the control component can be used for the primary and the secondary flight control.

For example, the control component of the primary flight control has, in particular, an elevator, a rudder or an aileron. The control component of the secondary flight control has, for example, a spoiler or a landing flap.

The invention also comprises the use in an aircraft of a transmission device according to one of the embodiments and features of the invention described above.

According to an exemplary embodiment of the invention the use also comprises use in an aircraft which has an at least partially fly-by-wire-flight control.

According to a further feature of the invention the transmission device is used not in an aircraft but in a vehicle, for example a road vehicle or water craft, wherein the vehicle has an at least partially drive-by-wire control.

The invention relates to the actuation of a control component. According to an exemplary embodiment of the invention a method is provided for switching from a first transmission mode to a second transmission mode for actuation of the control component in a vehicle, wherein for transmission of a control force a transmission device according to one of the previously described embodiments or features is provided, wherein the method comprises the following steps:

a) disposing the second force transmission point in a normal setting, in which an alteration in length effected by the at least one element for altering the length can be transmitted to the second force transmission point;

b) generating a control force by a control force generating device and transmission of the control force in a first mode, wherein the second force transmission point is disposed in the normal setting, and wherein the control force is generated by at least one element for altering the length or an actuator in the first side element;

c) displacing the connecting element in such a way that the second force transmission point is disposed in a redundancy setting, in which in the event of malfunction of an element for altering the length or of an actuator in one of the side elements the control force can be transmitted by the other one of the two side elements to the second force transmission point; and d) generating a control force by a control force generating device and transmission of the control force in a second mode, wherein the second force transmission point is disposed in the redundancy setting.

According to a further aspect of the invention the steps are carried out in an aircraft, in particular an airplane.

According to an exemplary embodiment of the invention the second side element is of rigid construction. In a first mode in step b) the control force is generated by the actuator in the first side element, and in the second mode in step d) the control force is generated by an actuating device which is provided outside the transmission device.

According to a further aspect of the invention the actuator is supported on one side, for example outside the transmission device, in order to be able to apply or transfer the control force to the other side of the actuator.

According to a further aspect of the invention the second force transmission point is disposed in the normal setting in the first position. Moreover, the second force transmission point is disposed in the redundancy setting in the second position.

According to an exemplary embodiment of the invention the second side element also has an actuator for altering the length of the side element, i.e., a first actuator is provided in the first side element, and a second actuator is provided in the second side element. The force transmission point is adjustable in at least one third position, wherein the transmission of force takes place in a region which lies in the middle between the first and the second connection points. In a first mode in step b) the control force is generated by both actuators, and in the second mode in step d) the control force is generated by only one of the two actuators.

According to a further aspect of the invention the second force transmission point is disposed in the normal setting in the third position. In the redundancy setting the second force transmission point is disposed in the first or second position.

According to a further aspect of the invention the two actuators act in parallel in step b).

According to an exemplary embodiment of the invention, the two actuators are monitored during the transmission of the control force in step b), wherein in the event of a malfunction of one of the two actuators an operating element is activated by which the displacement in step c) is carried out.

According to a further aspect of the invention the displacement takes place depending on the detected malfunction.

According to a further aspect of the invention, in the event of a reduced control force of one of the two actuators, the connecting element is displaced in such a way that the geometric (lever) ratios represent the force ratio between the intact and the defective or unsatisfactorily functioning actuator, or correspond to this ratio.

It may be pointed out that the features of the embodiments and aspects of the devices also apply to embodiments of the method and use of the devices and vice versa. Moreover, those features in respect of which this is not explicitly mentioned can be freely combined with one another.

Other objects, advantages and novel features of the present invention will become apparent from the following detailed description of one or more preferred embodiments when considered in conjunction with the accompanying drawings.

BRIEF DESCRIPTION OF THE DRAWINGS

An embodiment of the invention is described in greater detail below with reference to the appended drawings, in which:

FIG. 1 shows an aircraft with a control system for actuating a control component according to the invention in a schematic side view;

FIG. 3 shows a further example of a transmission device according to the invention;

FIGS. 12a and 12b show a further embodiment of a transmission device in a schematic construction drawing;

FIG. 13 shows the transmission device according to FIG. 12 during a transitional stage;

FIG. 14 shows the transmission device according to FIG. 12 in a further mode of operation;

DETAILED DESCRIPTION OF THE DRAWINGS

Figure 2A:
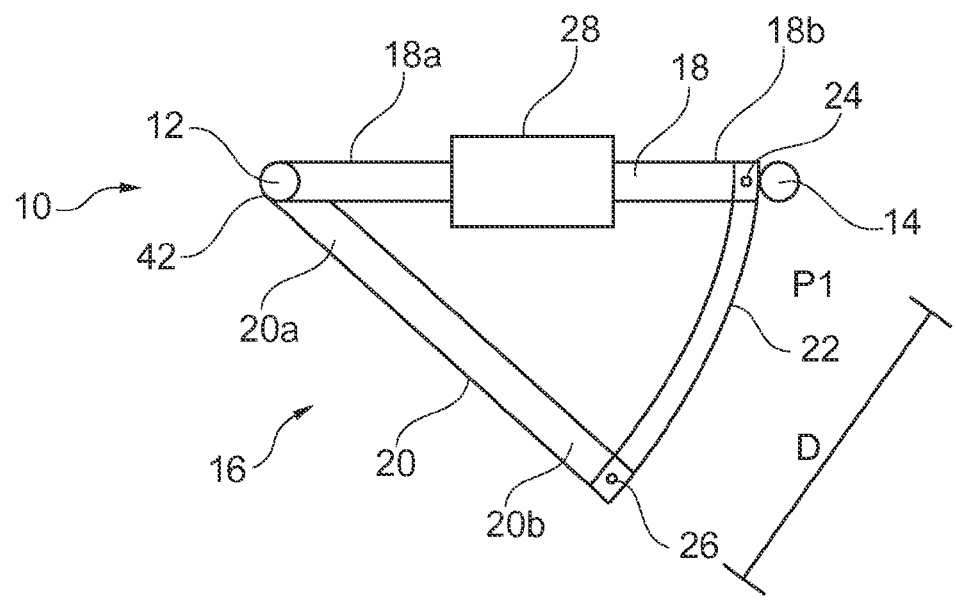
FIGS. 2a and 2b show a transmission device for transmission of a control force in a schematic functional diagram.

An aircraft 100 is shown in FIG. 1 in a schematic side view. The aircraft 100 has a control system 110 for actuating a control component. The control system has an input device 112 for input of the control command, a control force generating device 114, a transmission system 116 for transmission of the control force and at least one aeronautical control component 118. The transmission system 116 has at least one transmission device 120 which is described below in various embodiments.

The aeronautical control component 118 is shown in FIG. 1 as a tail fin, i.e., the control component is provided for the primary flight control. According to a further aspect of the invention, which is not shown in greater detail, the control component may also be provided for the secondary flight control. In other words, the control component can for example be an elevator or an aileron and also a spoiler or a landing flap.

Figure 2B:
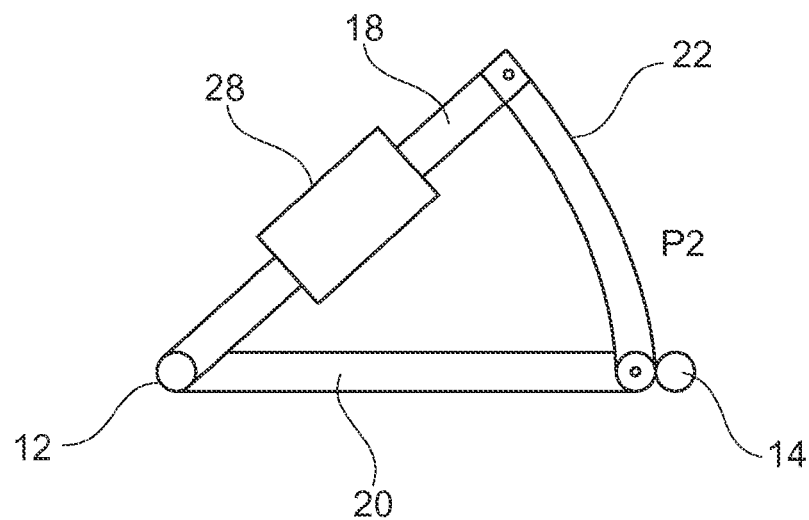

A transmission device 10 for transmission of a control force in a vehicle is shown schematically in FIG. 2. The transmission device 10 is shown in FIG. 2a in a first transmission mode and in FIG. 2b in a second transmission mode.

The transmission device 10 has a first force transmission point 12, a second force transmission point 14 and a coupling unit 16 disposed between the first and the second force transmission points.

The coupling unit has a first side element 18, a second side element 20 and a connecting element 22.

The first side element 18 is connected by one end 18a to the first force transmission point 12 and by the other end, identified by reference sign 18b, to the connecting element 22 at a first connection point 24.

The second side element 20 is connected by an end 20a to the first force transmission point 12 and by the other end, identified by reference sign 20b, to the connecting element 22 at a second connection point 26.

As shown in FIG. 2a, the first and the second connection points 24, 26 on the connecting element 22 are spaced apart from one another, where the spacing between the first and the second connection points 24, 26 is indicated by the reference sign D.

According to a further embodiment, which is not presented in greater detail, the two side elements 18, 20 can also be connected to the first force transmission point 12 indirectly with the aid of an attachment element (not illustrated).

With reference to FIG. 2, at least the first side element 18 has an element 28 for altering the length of the side element.

The second force transmission point 14 is provided on the connecting element 22 and is adjustable at least between a first position P1 which is shown in FIG. 2a and a second position P2 which is shown in FIG. 2b. In this case the second force transmission point 14 is disposed in the first position P1 in the region of the first connection point 24 and in the second position P2 is disposed in the region of the second connection point 26.

According to a further aspect of the invention which can be seen in FIGS. 2a and 2b, the transmission of force from the coupling unit 16 to the second force transmission point 14 takes place via the connecting element 22.

According to a further aspect of the invention, which is not however shown in detail in FIG. 2, the coupling unit 16 is movable in such a way that the position of the second force transmission point can be adjusted.

The transmission of force from the coupling unit 16 to the first force transmission point 12 takes place via the connection to the first and the second side elements 18, 20.

According to a further aspect of the invention a guide element 30 is provided on the connecting element 22, and the connecting element 22 is movably retained in relation to the guide element 30 between the first position P1 and the second position P2. As can be seen in FIG. 3, the second force transmission point 14 is formed on the guide element 30. In other words, the transmission of force takes place from the connecting element 22 via the guide element 30 to the second force transmission point 14.

According to a further aspect of the invention which is shown in FIG. 4, a control rod 32, 34 is articulated on each of the two force transmission points 12, 14 for transmitting the control force.

According to a further aspect of the invention which is also shown in FIG. 4 but is not absolutely necessary, the control rods 32, 34 are retained in a linear guide 36 so as to be movable in the rod direction.

Figure 4A:
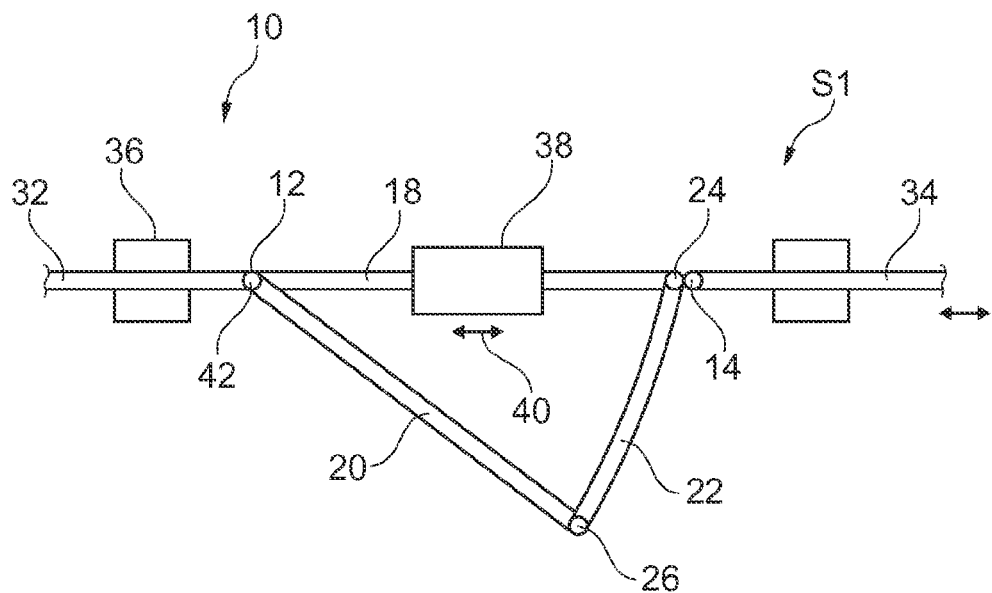
FIGS. 4a and 4b show a further embodiment of a transmission device according to the invention.

According to a further aspect of the invention the element for altering the length 28 is an actuator 38 which is indicated schematically in FIG. 4a by a double arrow 40. The actuator 38 is, for example, an electromechanical or a fluid-mechanical actuator.

As already mentioned, the element for altering the length 28 may also be a spring element, which is not however shown in greater detail.

According to a further aspect of the invention, as indicated in FIGS. 2 and 4, the respective one end of the first and of the second side elements, i.e. the two ends 18a, 20a, are retained at a common retaining point on the first force transmission point 12, wherein the common retaining point is indicated schematically by a circle 42 in the figures.

In general, according to the invention, the connection of the first side element 18 and of the second side element 20 in the region of the first force transmission point 12 is designed to be rotatable.

According to a further aspect of the invention the first and the second side elements 18, 20 together with the connecting element 22 form a triangle, on the basis of the attachment points of the individual elements or of the points of connection thereof to one another. In this case the connection points are designed to be rotatable.

According to an aspect of the invention the side elements are linear, but could also have some other shape.

According to a further aspect of the invention which is shown in FIG. 3, but may also be provided independently of the guide element and the other details described in FIG. 3, the connecting element 22 forms an arc of a circle 44, wherein the center point of the arc shown schematically in FIG. 3 and denoted by the reference numeral 46 is disposed in the region of the common retaining point 42.

Figure 4B:
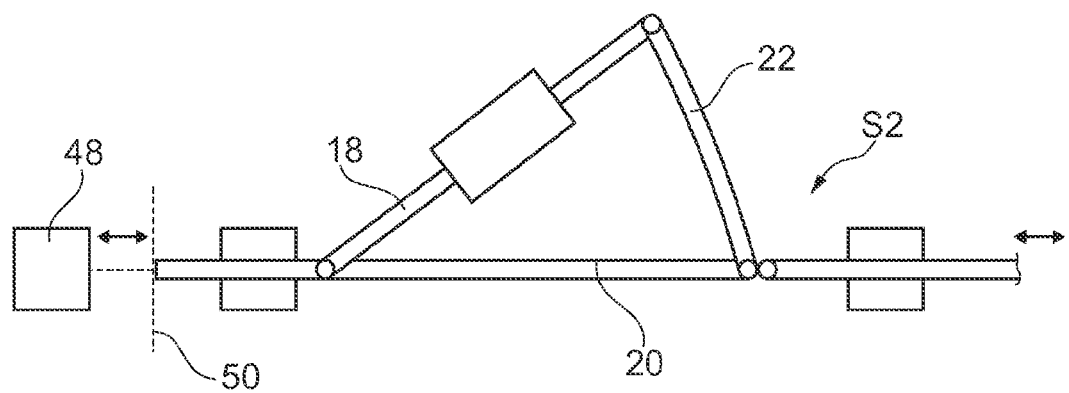

According to a further aspect of the invention, which is also shown in FIGS. 4a and 4b, the second side element 20 is of rigid construction. The coupling unit 16 is movable between a first setting S1 which is shown in FIG. 4a and a second setting S2 which is shown in FIG. 4b. In the first setting S1 a transmission of force takes place at the second force transmission point 14 in a region which is disposed in alignment with the connection of the first side element 18 to the first force transmission point 12 and the first connection point 24.

As can be seen in FIG. 4b, in the second setting S2 a transmission of force takes place at the second force transmission point 14 in a region disposed in alignment with the connection of the second side element 20 to the first force transmission point 14 and the second connection point 26.

In the first setting S1 the control force in the transmission device 10 is generated by the actuator 38. In the second setting S2 the control force is generated by an actuating device 48 which is provided outside the transmission device, as is indicated by a broken line 50. The actuating device 48 is for example a joystick.

The aspects described above with the rigid second side element 20 can also be used in combination with features which are described with reference to other figures.

The design of the transmission device 10 with a rigid side element and an actuator in the other side element makes it possible, for example, for an aircraft which is already approved, with a conventional control, i.e., a mechanical coupling between the actuating element and the element to be driven, to be equipped with an additional fly-by-wire flight control, in which for the actuation of the control element there is initially an electronic or electrical control command that is supplied via an electrical line to an actuator, which then generates the actuating force.

This combination is particularly suitable for testing new fly-by-wire airplane components which can be tested during flight operations due to the redundancy made available by the invention. If, during the fly-by-wire flight control, a failure of the control occurs, for example due to a software error, or also due to a failure of the actuator (for example, an electromechanical actuator), by the displacement of the coupling unit from the first to the second setting the control can take place by means of conventional components, such as for example by means of a joystick or other actuating elements which can be operated by the pilot.

In other words, a kinematic design is provided by the invention, which, in the event of failure of the fly-by-wire flight control system, ensures a redundancy which enables the necessary safety even in the event of a failure of the fly-by-wire flight control.

According to a further aspect of the invention the actuators should, in each case, be designed individually for these load conditions, i.e. during normal flight operations using both actuators they are both only considered to be half-loaded.

The transmission device according to the invention is particularly suitable for electromechanical actuators, for which it was hitherto very expensive to make a redundancy available. The use of electromechanical actuator has the advantage that the entire system can be designed independently of a hydraulic system, which is advantageous in particular in modern fly-by-wire airplanes or drive-by-wire vehicles, since these are increasingly electrically operated.

However, the transmission device according to the invention is also suitable in particular for hydraulic control systems, since the complicated operating elements with double hydraulic circuit of conventional systems can be replaced by simple operating cylinders, which represents a cost advantage and also a weight advantage.

According to a further aspect of the invention, which is described in FIGS. 5 to 8 with reference to different embodiments, the second side element 20 also has an actuator 52 for altering the length of the side element 20. At least a third setting S3 is provided, in which the transmission of force takes place on the second force transmission point 14 in a region lying in the middle between the first connection point 24 and the second connection point 26.

Figure 6:
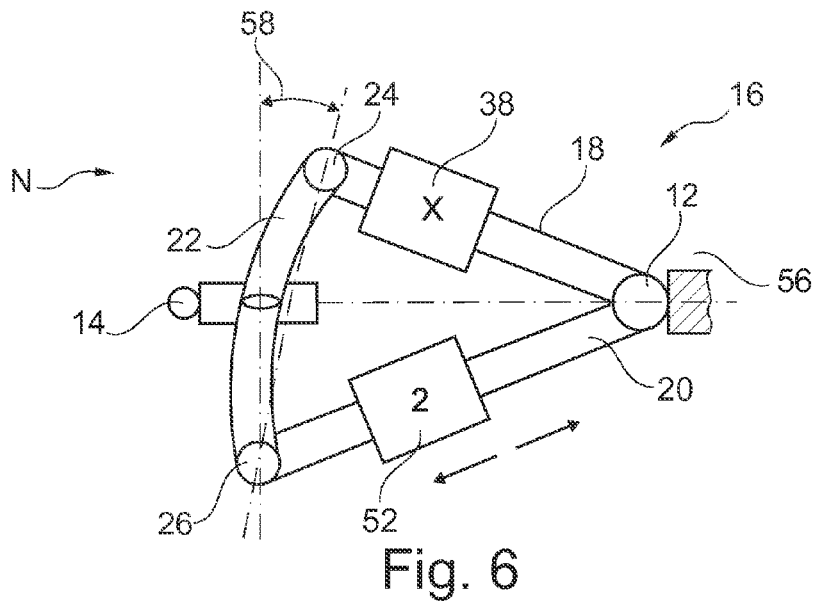
FIG. 6 shows a further embodiment of the transmission device according to FIG. 5.

According to a further aspect of the invention the third position forms the normal setting in which both actuators 38, 52 are actuated in order to generate the control force, wherein the first and the second settings S1, S2 each form a redundancy setting which is shown in FIG. 6 and is identified by the reference signs R1, R2 and in which in each case only one of the two actuators generates the control force.

First of all, however, the normal setting also denoted by N in FIG. 5 will be described. The two actuators 38, 52 are shown schematically in FIG. 5a in a retracted state, i.e., forming a minimal length of the side elements 18, 20. The length of the side elements 18, 20 can be altered by actuation of the actuators, so that the second force transmission point 14 is pushed to the left, as is indicated by a double arrow 54. The state which can be achieved with the actuators 38, 52 extended to the maximum is shown schematically in FIG. 5b.

As indicated schematically, the two actuators act in the same way. In the context of the functional arrangement, the two actuators act, for example, in parallel, even if they do not have to be geometrically parallel. The alteration in length of the two side elements 18, 20 gives rise to an alteration in the triangular structure, i.e., an extension of the length. In other words, the transmission device 10 generates an actuating force for control of a control component. If, as shown in FIGS. 5a and 5b, the first force transmission point 12 is retained immovably, which is indicated by hatching 56, this inevitably leads to a displacement of the second force transmission point 14.

According to a further aspect of the invention, which is indicated in FIG. 6, in the event of failure of one of the two actuators 38, 52 in the normal position N or S3 it occur that the transmission of force no longer takes place properly, since the one-sided alteration in length for example of the second side element 20 leads to a shifting of the triangular structure.

The connection points should generally be designed to be rotatable, at least in the angular alterations to be expected because of the necessary stretching or expansion and compression of the triangular structure, so that a displacement of the force transmission points, i.e., an alteration in the spacing between the first and the second force transmission points can certainly occur.

As indicated in FIG. 6, in the event of failure of an actuator, a displacement of the connecting element 22 occurs with regard to the alignment thereof relative to the connecting line between the first and the second force transmission points or to a perpendicular to this connecting line. This is indicated in FIG. 6 by an angle 58. Consequently the angle 58 constitutes an error indicator by which the malfunction of one of the two actuators can be detected.

Moreover, it is possible to determine which of the two actuators is defective or suffers a malfunction by means of sensors.

A defective spindle motor, for example, means that there is no longer any alteration in length on this side. Accordingly, there is no longer any change of location at the respective connection point to the connecting element 22. On the other hand, an actuation of the functioning actuator only leads to a reduced offset of the second force transmission point, and to an offset of the connection point of the respective side element to the connecting element. Thus, in addition to the angular alteration of the connecting element 22, the different displacement of the location of the two connection points on the connecting element is an indicator of the malfunction of an actuator.

When an actuator is used that in the event of failure or defect is no longer active, that is to say it also has no self-locking or braking action, e.g., in the case of a hydraulic cylinder, if one actuator fails when the functioning actuator is actuated no offset of the force transmission points with respect to one another would occur, but only an offset of the connection point of the respective side element to the connecting element, in which the functioning actuator is disposed in one direction and an offset of the other connection point in the other direction. Merely in its stop positions, i.e. in the event of minimum or maximum deflection, the defective actuator would also lead to the force transmission points moving relative to one another.

Figure 5A:
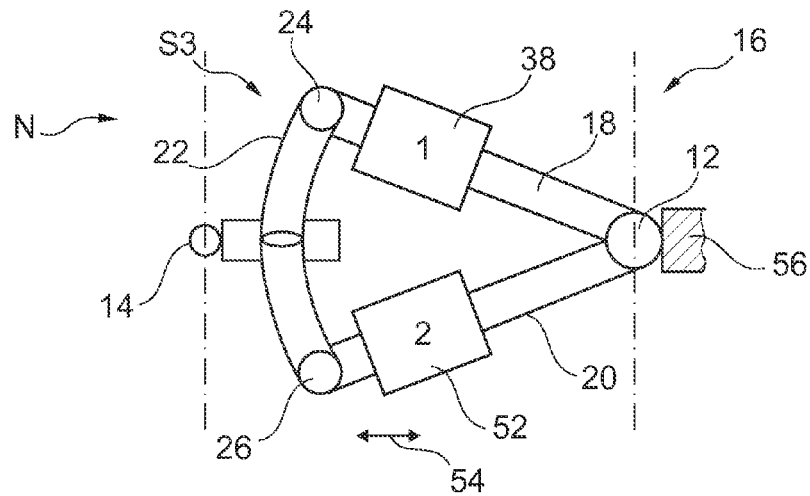
FIGS. 5a and 5b show a further embodiment of a transmission device according to the invention.
Figure 5B:
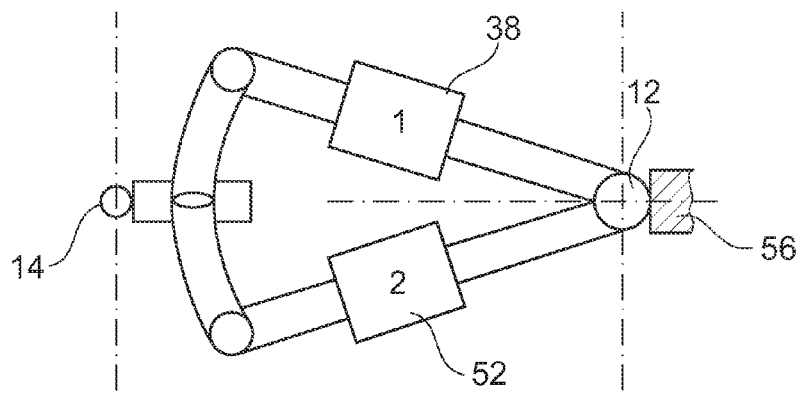

For the sake of simplicity are the two actuators are additionally identified by a 1 or a 2 in FIGS. 5a and 5b. As can be seen in FIG. 6, the failure of an actuator, in the case of FIG. 6 the actuator 38 on the first side element 18, is identified by an X instead of the number.

If a failure or a malfunction of an actuator occurs, the coupling unit 16 can be moved in such a way that the connecting element is displaced from the third setting S3, i.e., the normal setting N, into the first or second setting S1 or S2 respectively. This is indicated in FIG. 6 for example by means of the second setting S2.

Figure 7A:
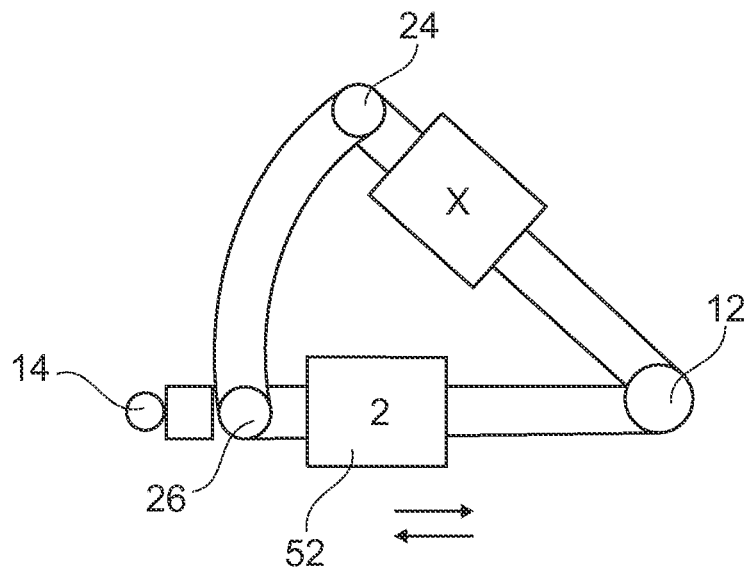
FIGS. 7a and 7b show the transmission device according to FIG. 5 in a further mode of operation.

As can be seen in FIG. 7a, the second side element 20 with the actuator 52 is located between the first force transmission point 12 and the second force transmission point 14. In other words, the second actuator in this case is connected in series instead of the parallel-connected actuator of FIG. 5 or 6.

Figure 7B:
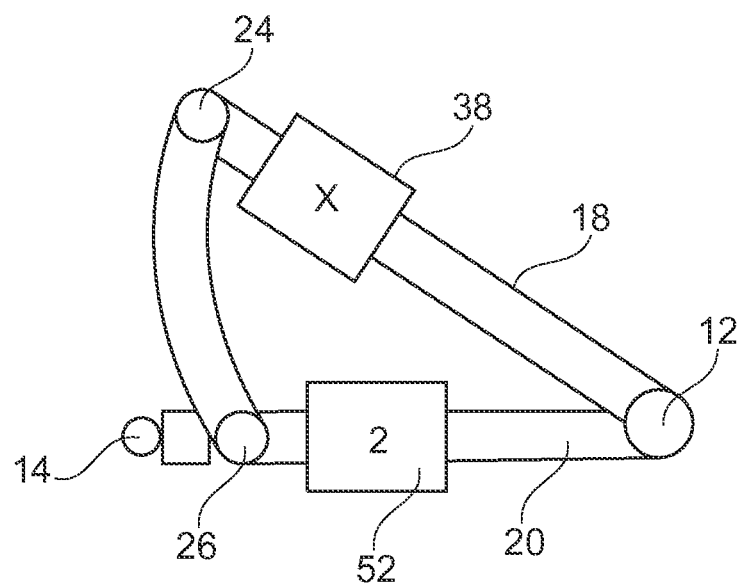

In FIG. 7a is the actuator 52 is shown in the extended position, i.e. the second side element 20 has the maximum length. If an actuation of the actuator 52 and a corresponding shortening of the length of the second side element 20 occurs, which is indicated by double arrows 60, the spacing between the first force transmission point 12 and the second force transmission point 14 also changes. As can be seen in FIG. 7b, because of the malfunction or the failure of the actuator 38 no alteration in length occurs in the region of the first side element 18. Consequently the first side element 18 remains more or less unchanged in its position, and only the connecting element 22 assumes another angular position in space, since the first connection point 24 is more or less unchangeable and the second connection point 26 moves to the right in FIG. 7b.

Figure 8A:
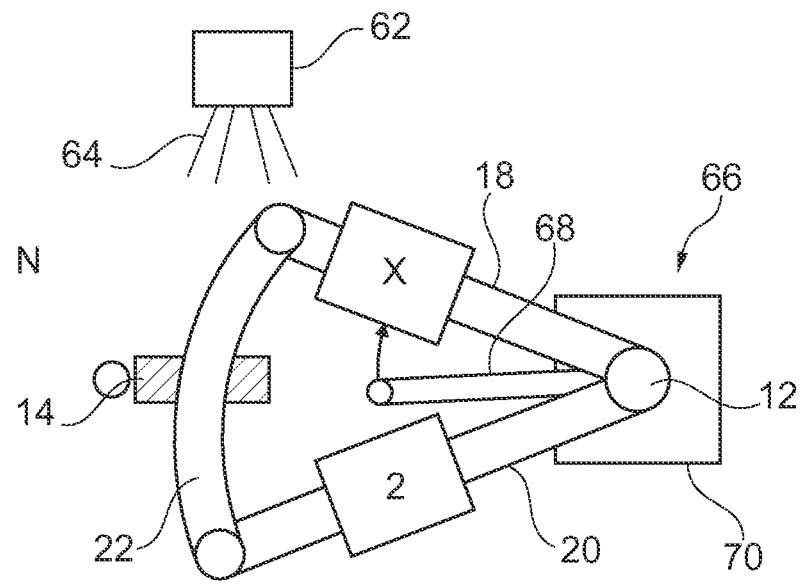
FIGS. 8a and 8b show a further embodiment of the transmission device according to FIG. 5.

According to a further aspect of the invention a device 62 is provided for monitoring the two actuators. This can take place, for example, by determination of the error indicator shown in FIG. 6, i.e., the angle 58, and detection of the change of location of the first or of the second connection point 26, which is indicated in FIG. 8a by a schematic hatching 64 which is intended to show the monitoring symbolically. Naturally, it is also possible to carry out the monitoring of the two actuators by sensors integrated in the actuator, such as are used in the area of the fly-by-wire control as a rule for the control and the return message of the executed control command.

Figure 8B:
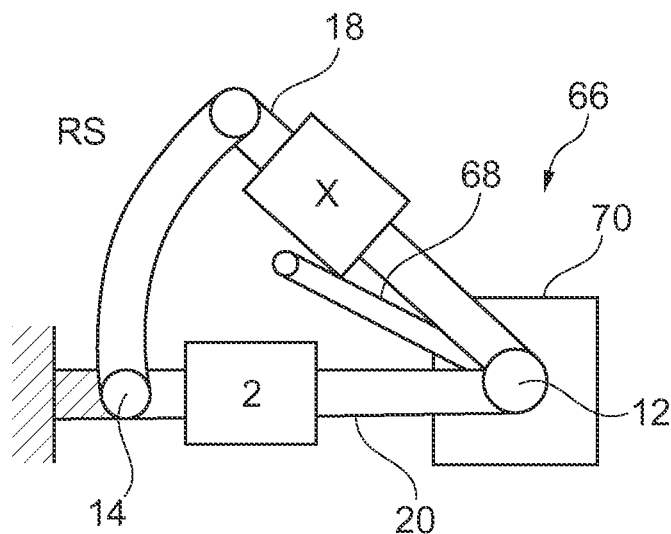

As shown in FIG. 8, an operating element 66 is also provided, by means of which the coupling unit 16 can be moved. This is shown in FIG. 8 by a schematic lever 68 which, driven, for example, by a motor 70, causes the triangle consisting of the first side element 18, the connecting element 22 and the second side element 20 to pivot about the first force transmission point 12 in such a way that it is possible to dispose the first or second actuator in series with the first and the second force transmission points. In FIG. 8b the second setting S2 is shown, i.e., the second redundancy setting R2 which the coupling unit 16 has assumed after the operating element 66 has carried out the movement.

For example the operating element 66 is activated by the monitoring device 62 in the event of failure or malfunction of an actuator.

In addition to the second setting shown in FIGS. 7 and 8, in the event of failure of the second actuator, i.e., the actuator 52 in the region of the second side element 20, the coupling unit 16 can also be moved into the other setting, i.e., into the first redundancy setting R1 or S1 so that in this setting the first actuator, i.e., the actuator 38 in the region of the first side element 18 can take over the actuation if a reverse failure of the actuators occurs.

Furthermore, according to a further aspect of the invention it is also possible to move the coupling unit 16 from the normal setting N or S3 into an intermediate position in such a way that different levers are formed, wherein the term "lever" relates to the spacings between the connection points 24, 26 and the force transmission direction, i.e., with the connection between the first and the second force transmission points 12, 14, i.e. in the region of the actuators for generating the control force, different levers which interact directly via the connecting element are formed on both sides. This is, for example, advantageous when a reduced performance of one of the actuators occurs, but not a complete failure of the actuator. If an actuator exhibits a drop in performance that is detected by means of the monitoring device, the coupling unit can move to such an extent that the different lever ratio reflects the different performances of the two actuators, i.e., the performance ratio thereof.

Embodiments of a method according to the invention are described below with the aid of FIGS. 9-11.

Figure 9:
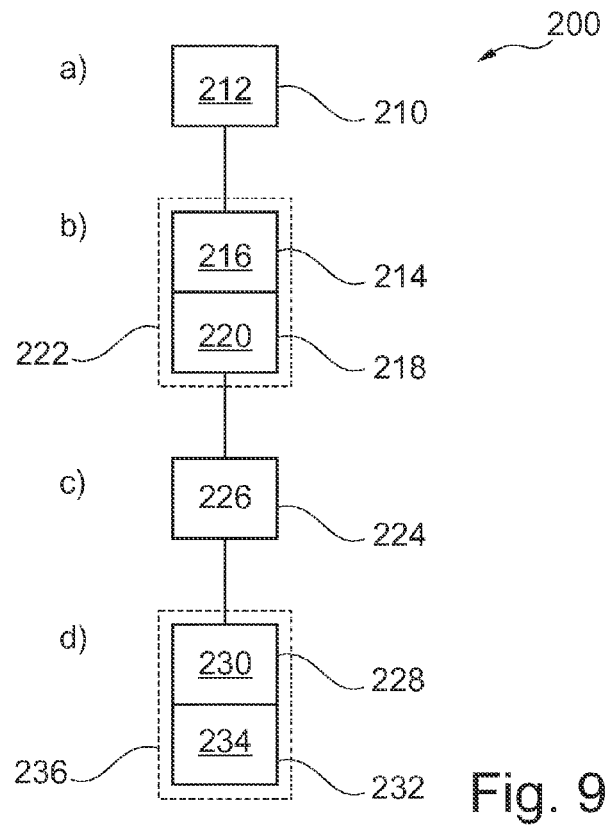
FIG. 9 shows method steps of a method according to the invention.

The essential steps of a method 200 according to the invention for switching from a first transmission mode to a second transmission mode for actuating a control component in a vehicle are shown schematically in FIG. 9, wherein a transmission device according to one of the embodiments and aspects described above is provided for transmission of a control force. The method 200 comprises the following steps:

In a first arrangement step 210 the second force transmission point is disposed in a normal setting 212 in which an alteration in length effected by the at least one element for altering the length can be transmitted to the second force transmission point.

A further step provides for the generation 214 of a control force 216 by a control force generating device and transmission 218 of the control force in a first mode 220, wherein the second force transmission point is disposed in the normal setting, and wherein the control force is generated by at least the element for altering the length or the actuator in the first side element. Since the generation 214 and the transmission 218 are in direct correlation, the individual features are combined in one common step which is indicated by a rectangle 222 shown by broken lines.

In a further step a displacement 224 of the connecting element takes place in such a way that the second force transmission point is disposed in a redundancy setting 226, in which in the event of malfunction of an actuator in one of the side elements the control force can be transmitted by the other one of the two side elements to the second force transmission point.

Furthermore, generation 228 of a control force 230 by a control force generating device and transmission 232 of the control force in a second mode 234 are provided, wherein the second force transmission point is disposed in the redundancy setting. Since the generation of the control force and the transmission the control force, i.e. the sub-steps 228, 232 are also in a direct correlation, these are combined into a rectangle 236 shown by broken lines.

The arrangement 210 is also denoted as step a), the generation 214 and the transmission 218 as step b), the displacement 224 as step c) and the generation 228 and the transmission 232 as step d).

Figure 10:
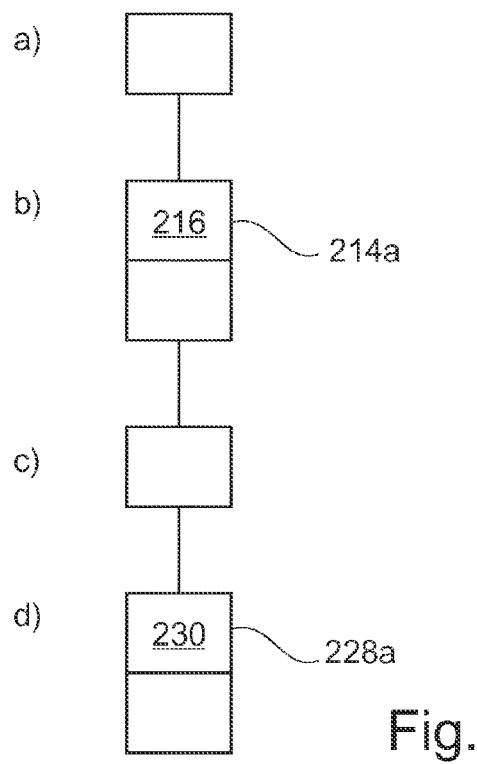
FIG. 10 shows a further embodiment of the method according to FIG. 9.

According to a further aspect of the invention shown in FIG. 10, the second side element is of rigid construction, and in the first mode in step b) the control force 216 is generated by the actuator in the first side element, which is indicated by the reference sign 214a. It is further provided that in the second mode in step d) the control force 230 is generated by an actuating device which is provided outside the transmission device, which is indicated by the reference sign 228a.

Figure 11:
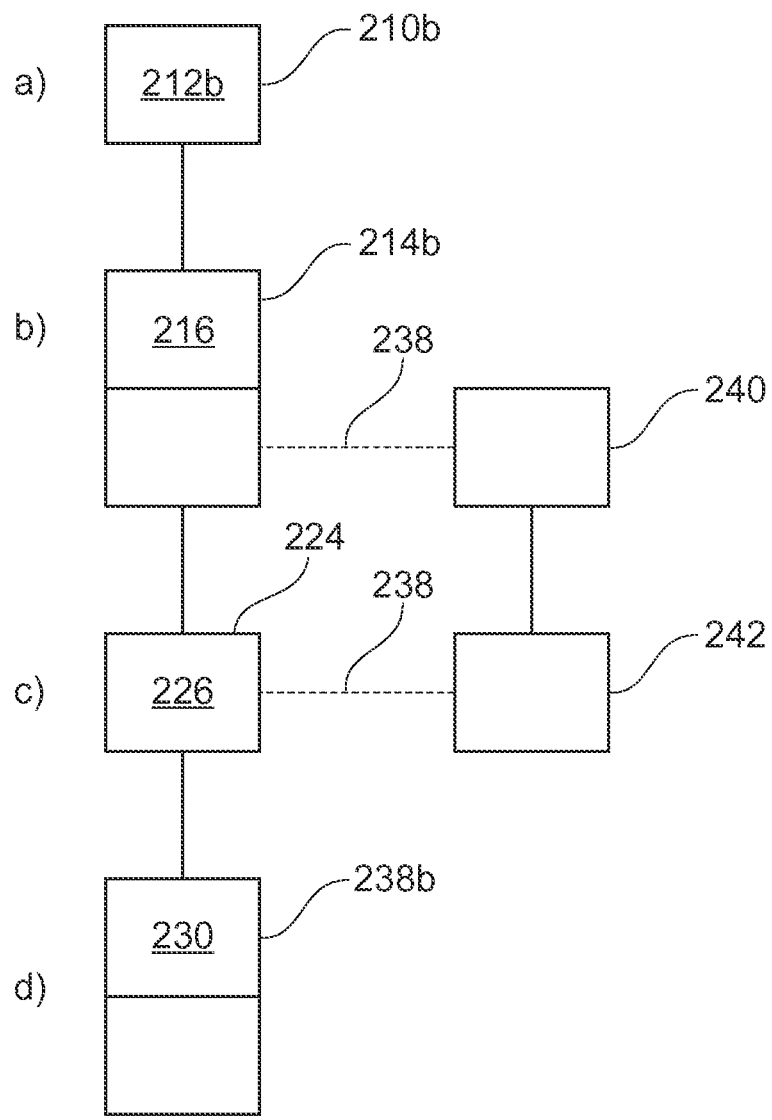
FIG. 11 shows a further embodiment of the method according to FIG. 9.

According to a further embodiment of the invention shown in FIG. 11, the second side element also has an actuator for altering the length of the side element, and the second force transmission point is adjustable in at least a third setting in which the transmission of force takes place in a region which lies in the middle between the first and the second connection points. The arrangement of the second force transmission point in the third setting is indicated by the reference sign 210b and the third setting is indicated by the reference sign 212b. Moreover it is provided that in the first mode in step b) the control force is generated by both actuators, which is indicated by the reference sign 214b.

Moreover, in the second mode in step d), the control force is generated by only one of the two actuators, which is indicated by the reference sign 238b.

According to a further aspect of the invention which is also illustrated in FIG. 11, but does not of necessity have to be combined with the features described above or the embodiment of the method, which is indicated by broken connection lines 238, monitoring 240 of the two actuators takes place during the transmission 218 of the control force in step b). In the event of a malfunction of one of the two actuators an operating element is activated, which is indicated by the reference sign 242, wherein the displacement in step c) into the redundancy setting 226 is carried out by the operating element. The displacement by means of the operating element is indicated by the reference sign 224c.

FIG. 12 shows a further embodiment of a transmission device according to the invention, wherein the same features are provided with the same reference signs and it is not intended to describe these features in detail in order to avoid unnecessary repetitions. FIG. 12a shows the first side element 18 with a minimum length and FIG. 12b shows it with a maximum length, i.e. in 12b the actuator is activated so that it has effected an alteration in length.

The coupling unit 16 is shown schematically by simple linear elements, wherein for guiding of the connecting element 22 two ball bearings 76 are provided on the end of the control rod in the region of the second force transmission point, wherein this guide has been depicted in the drawing by a section through the rod and is identified by the reference sign 72.

In FIGS. 12a and 12b the first side element is arranged in series with the actuator 38, i.e. between the first and the second force transmission points 12, 14.

In the event of a failure of the actuator 38, then the coupling unit 16 can be pivoted in such a way that the second side element 20 is disposed instead of the first side element 18 between the first and the second force transmission points 12, 14. An intermediate setting for this movement process is shown in FIG. 13.

FIG. 14 shows the aforementioned state in which the second side element 20 is connected in series, so that a transmission of force is possible, wherein for transmission of force in this case the aforementioned introduction of force outside the transmission device 10 is provided, for example by a joystick.

In this position the connecting element 22 is only retained on its end, the upper end in FIG. 14, and the lower end is freely movable in the longitudinal direction of the first side element 18, which is indicated by a double arrow 74.

Figure 15:
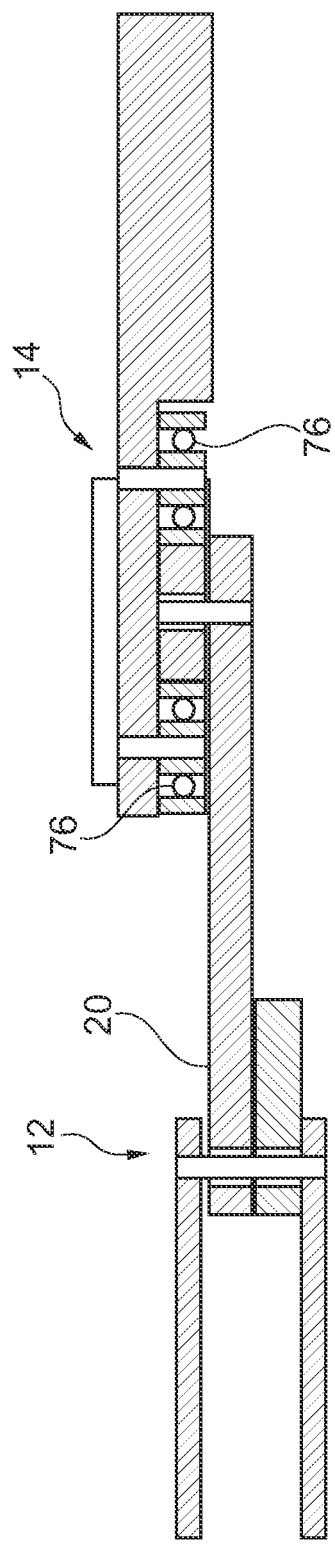
FIG. 15 shows a sectional drawing of the transmission device according to FIG. 14 along the section lines A-A.

FIG. 15 shows a sectional representation along the section lines A-A in FIG. 14, wherein it can be seen that the second side element 20 is provided from a simple longitudinal profile and the connection points are designed to ensure the movability with ball bearings 76.

Figure 16:
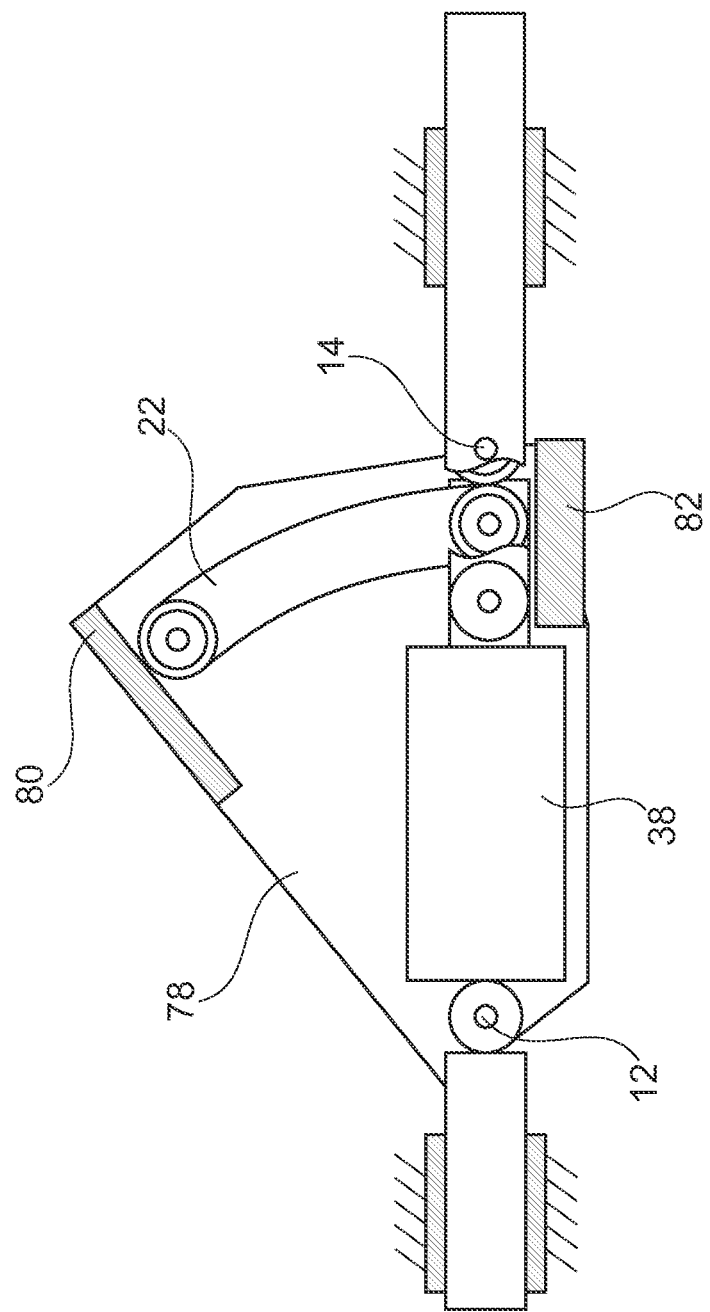
FIG. 16 shows a further embodiment of a transmission device in a schematic sectional representation.

FIG. 16 shows a further embodiment where, instead of the second side element 20, a base plate 78 is provided which is retained at one end so as to be rotatable on the first force transmission point 12, wherein the actuator 38 is also articulated at this point. The base plate has a first stop 80 and a second stop 82, wherein between the two stops is provided the connecting element 22 which is connected at its upper end to the base plate and at its lower end to the actuator 38. Naturally, the connections are designed to be rotatable. The lower stop 82 ensures that in this setting the actuator 38 is arranged in series. If the base plate 78 pivots downwards then the control rod element strikes the upper stop 80 in the region of the second force transmission point 14, so that in this setting the transmission can take place by the base plate.

Figure 17:
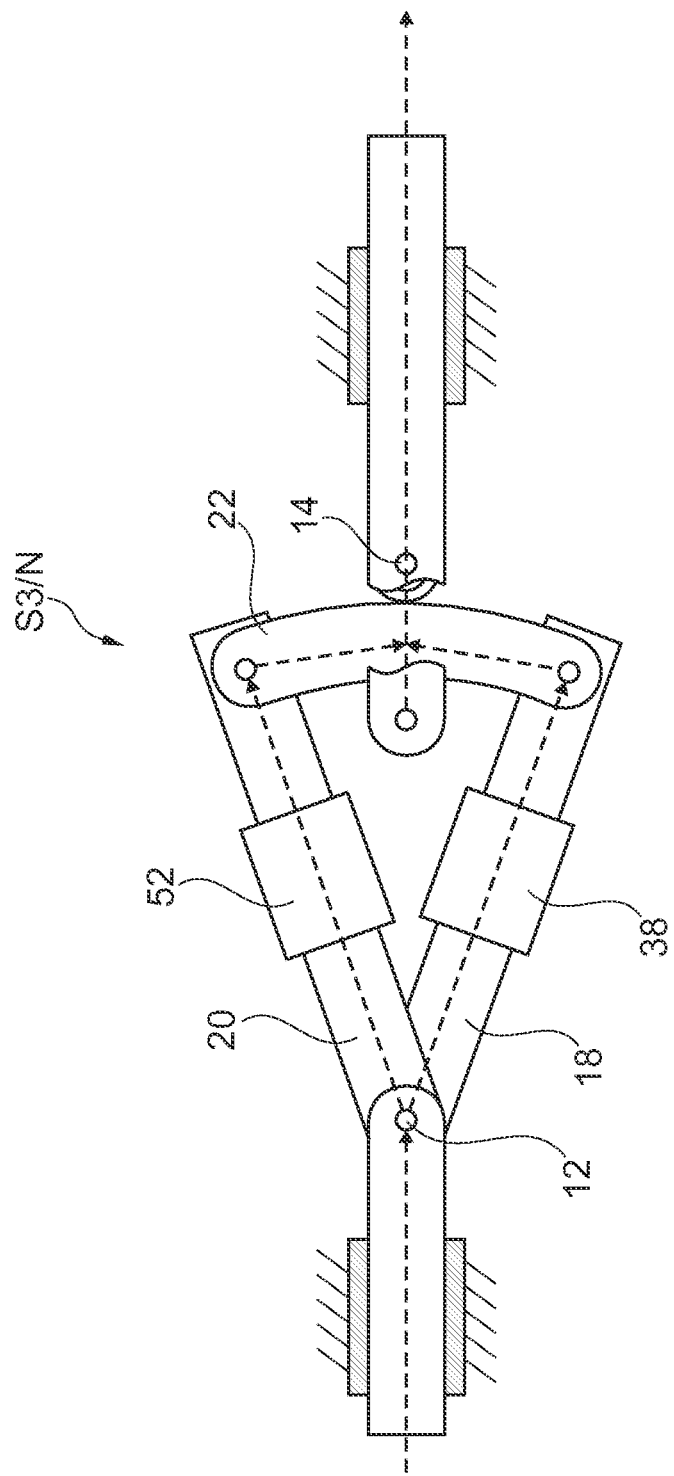
FIG. 17 shows a further embodiment of a transmission device.
Figure 18:
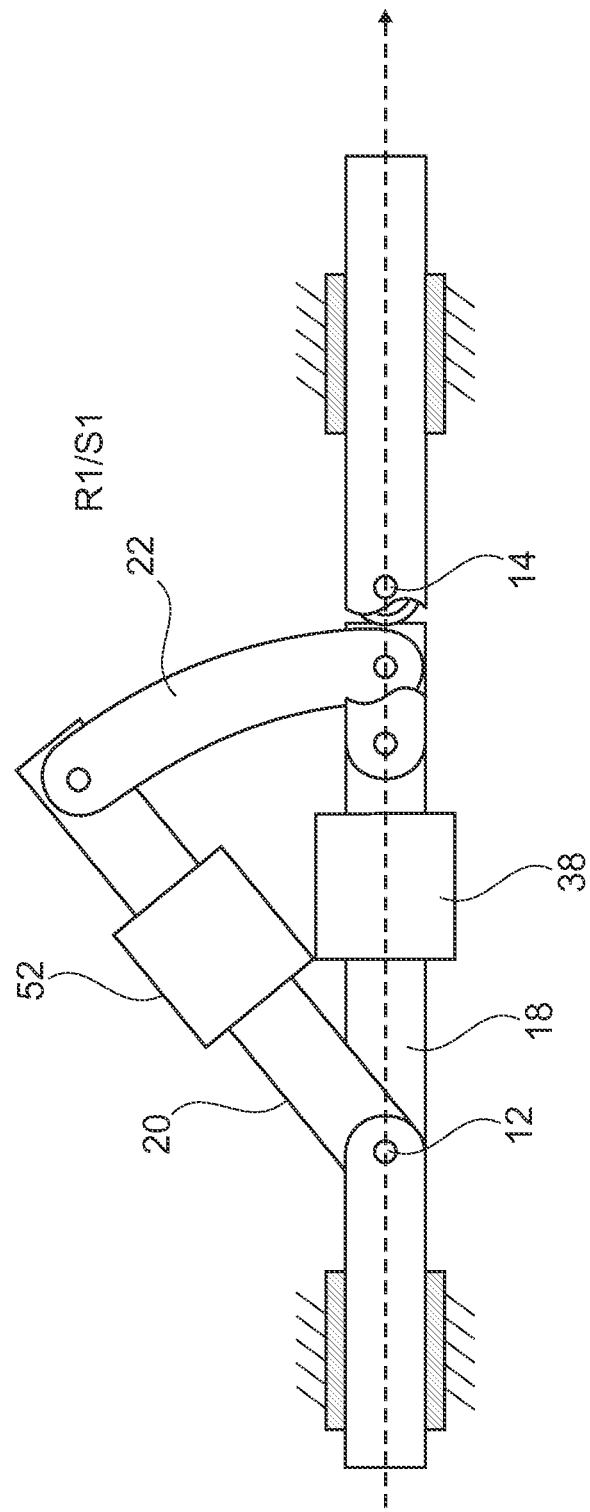
FIG. 18 shows the transmission device according to FIG. 17 in a further mode of operation.

FIG. 17 shows, in a representation similar to FIG. 12 and the following figures, a further embodiment in which an actuator is also provided in the second side element 20, as has already been shown schematically in FIGS. 5 to 8. FIG. 17 shows the so-called normal setting, in which the two actuators act in parallel with one another.

In the event of failure for example of the second actuator 52, the coupling unit 16 is pivoted in such a way that the first actuator 38 is arranged in series between the first force transmission point 12 and the second force transmission point 14.

The embodiments described above can be combined in different ways. In particular features of the devices can be used for embodiments of the method as well as use of the devices and vice versa.

In addition it may be pointed out that "comprising" does not exclude any other elements or steps and "a" or "an" does not exclude a plurality. It is also pointed out that features or steps which have been described with reference to one of the above embodiments can also be used in combination with other features or steps of other embodiments described above. Reference sign in the claims are not to be regarded as limitation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A transmission device for transmission of a control force in a vehicle, comprising:
   a first force transmission point;
   a second force transmission point; and
   a coupling unit disposed between the first and the second force transmission points,
   wherein the coupling unit has a first side element, a second side element, and a connecting element,
   wherein the first and the second side elements are each rotatably connected at one end to the first force transmission point and are each connected at a respective other end to the connecting element at a respective first or second connection point,
   wherein the first and the second connection points are spaced apart from one another on the connecting element,
   wherein at least the first side element has an element configured to alter a length of the first side element between the first force transmission point and the first connection point, and
   wherein the second force transmission point is provided on the connecting element and is adjustable at least between a first and a second position, wherein the second force transmission point in the first position is disposed in the region of the first connection point and in the second position is disposed in the region of the second connection point.

2. The transmission device according to claim 1, wherein the element for alteration in length is an actuator.

3. The transmission device according to claim 1, wherein one end of the first and of the second side elements is retained at a common retaining point on the first force transmission point.

4. The transmission device according to claim 1, wherein the connecting element forms an arc of a circle, wherein a center point of the arc lies in a region of the common retaining point.

5. The transmission device according to claim 2, wherein
   the second side element is rigid;
   the coupling unit is movable between a first setting and a second setting;
   in the first setting a transmission of force takes place at the second force transmission point in a region disposed in alignment with the connection of the first side element to the first force transmission point and the first connection point; and
   in the second setting a transmission of force takes place in a region disposed in alignment with the connection of the second side element to the first force transmission point and the second connection point.

6. The transmission device according to claim 5, wherein in the first setting the control force is generated in the transmission device by the actuator, and wherein in the second position the control force is generated by an actuating device provided outside the transmission device.

7. The transmission device according to claim 1, wherein the second side element also has an actuator configured to alter a length of the side element; and
   wherein at least one third position is provided, wherein the transmission of force takes place in a region lying in the middle between the first and the second connection points.

8. The transmission device according to claim 7, wherein the third position forms a normal position in which both actuators are actuated for generating the control force; and wherein the first and the second positions each form a redundancy position in which only one of the two actuators generates the control force.

9. An aircraft with a control system for actuating a control component; wherein the control system comprises:
   an input device configured for input of a control command;
   control force generating device;
   a transmission system configured for transmission of the control force; and
   at least one aeronautical control component,
      wherein the transmission system has at least one transmission device comprising
         a first force transmission point;
         a second force transmission point; and
         a coupling unit disposed between the first and the second force transmission points,
         wherein the coupling unit has a first side element, a second side element, and a connecting element,
         wherein the first and the second side elements are each rotatably connected at one end to the first force transmission point and are each connected at a respective other end to the connecting element at a respective first or second connection point, wherein the first and the second connection points are spaced apart from one another on the connecting element, wherein at least the first side element has an element configured to alter a length of the side element, wherein the second force transmission point is provided on the connecting element and is adjustable at least between a first and a second position, wherein the second force transmission point in the first position is disposed in the region of the first connection point and in the second position is disposed in the region of the second connection point, and wherein the aircraft has an at least partially fly-by-wire flight control.

10. The aircraft according to claim 9, wherein the length of the first side element is altered between the first force transmission point and the first connection point.

* * * * *